April 10, 1945. R. C. BLAYLOCK ET AL 2,373,221
FLEXIBLE TANK AND SUPPORT MEANS
Filed Jan. 29, 1943 2 Sheets-Sheet 1
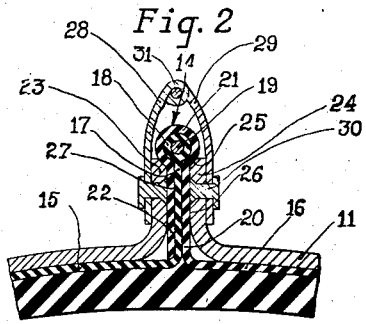
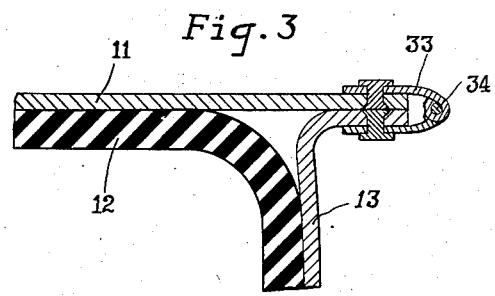
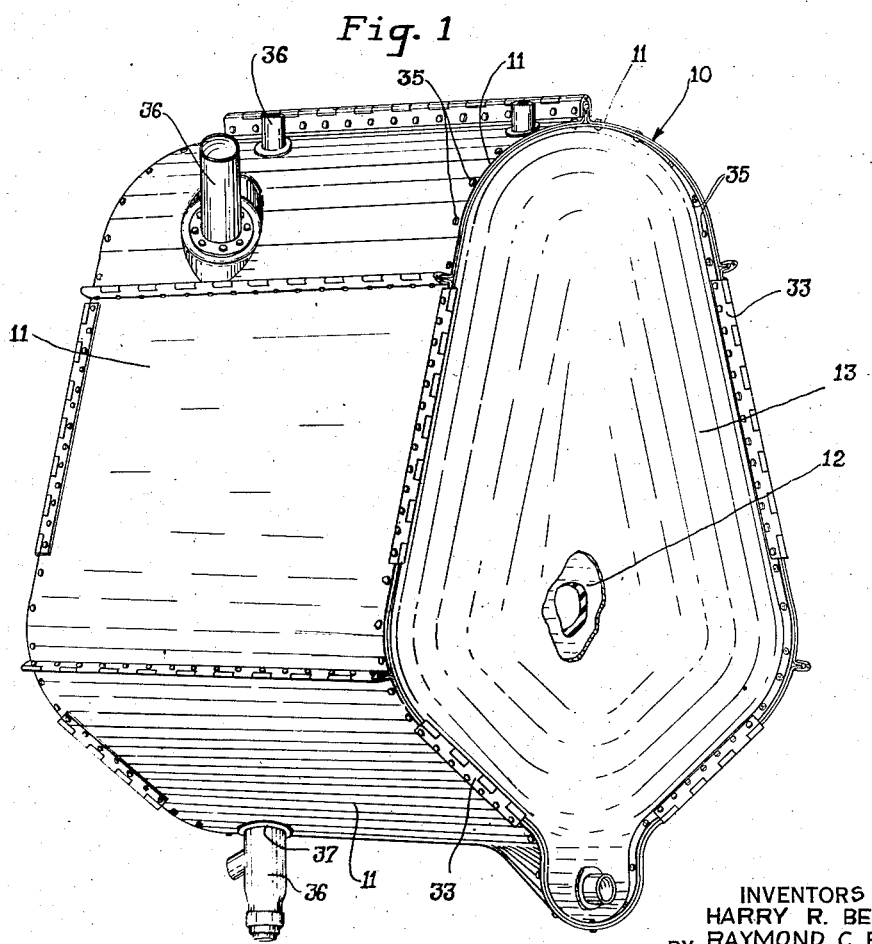
INVENTORS
HARRY R. BERRISFORD
RAYMOND C. BLAYLOCK
BY
ATTORNEY April 10, 1945.   R. C. BLAYLOCK ET AL   2,373,221
FLEXIBLE TANK AND SUPPORT MEANS
Filed Jan. 29, 1943   2 Sheets-Sheet 2

INVENTORS
HARRY R. BERRISFORD
BY RAYMOND C. BLAYLOCK
ATTORNEY

Patented Apr. 10, 1945

2,373,221

UNITED STATES PATENT OFFICE 2,373,221

FLEXIBLE TANK AND SUPPORT MEANS

Raymond C. Blaylock and Harry R. Berrisford, Bexley, Ohio, assignors to Curtiss-Wright Corporation, a corporation of Delaware Application January 29, 1943, Serial No. 474,018

4 Claims. (Cl. 220—63)

This invention relates to flexible fluid-containing tanks and to supporting means therefor.

With tanks of this type adequate support is seldom provided to render them faultless for their use in all situations in which the aircraft may be placed. In airplanes designed particularly for their take off by catapulting, where there is a tremendous shock extended to the airplane, the tanks with the supporting means used heretofore have often failed, causing collapse of the flexible tank and disruption of the fuel system.

It is therefore an object of the present invention to provide a flexible tank and a supporting means therefor which will withstand practically all of the shocks and strains to which such equipment may be subjected.

It is another object of the invention to provide a supporting means for a flexible type of fuel tank wherein the same, even though disposed within confined quarters within the aircraft, may be easily disassembled to permit the removal of the flexible tank for repair of the same, and wherein time will be saved in the assembly of fuel tanks, thereby rendering the same inexpensive to manufacture.

It is still another object to provide a tab for use with collapsible tanks which is of simple construction, easy to assemble and free of weaknesses inherent in tabs utilized heretofore, and, as well, one having enlarged head portions whereby positive locking with the sections may be had without the necessity of the tab being weakened by the insertion of holes therethrough.

According to the present invention, the supporting means for the flexible tank is made up in sections adapted to incase the tank which is substantially of cylindrical configuration. These sections respectively have flanges adapted to cooperate with enlarged head portions of tabs spaced about the periphery of the flexible tank. Once these formations are registered with the head portions of the tabs, they are secured together by means of cooperating gripping elements on the respective sections, these elements being held together by means of a longitudinally extending pin extending between the same, to form a structure similar to a piano hinge. The pin is insertable from the end of the tank whereby access to the support is only necessary at the end thereof, in order to disassemble these surrounding sections.

The supporting means also includes end plates adapted to be connected to the ends of the plurality of the surrounding sections. In order that these end plates may be disassembled readily, piano hinge type connections are similarly used for the connection of the same to the surrounding sections. Thus, by simply removing a pin or wire, the supporting means may be readily disassembled even though the entire supporting means may be located within a confined space in the aircraft.

For other objects and for a better understanding of the invention reference may be had to the following detailed description taken in connection with the accompanying drawings, in which Fig. 1 is a perspective view of a completely assembled tank with its supporting means of the present invention.

Fig. 2 is an enlarged cross section illustrating the connection of the tab with the ends of adjacent sections, and of the cooperating gripping elements.

Fig. 3 is also an enlarged cross sectional view illustrating the use of the gripping elements for the connection of the end plate to the surrounding sections, there being no tab disposed between the plate and sections.

Referring now particularly to Fig. 1, there is shown a supporting means 10 comprising a plurality of sections 11 which surround a fluid containing tank or cell 12 formed of flexible or collapsible material. This tank is of substantially cylindrical shape whereby the sections 11 may be continuous about the same. The supporting means 10 further comprises end plates 13 connected to the ends of the surrounding sections 11.

Figure 6:
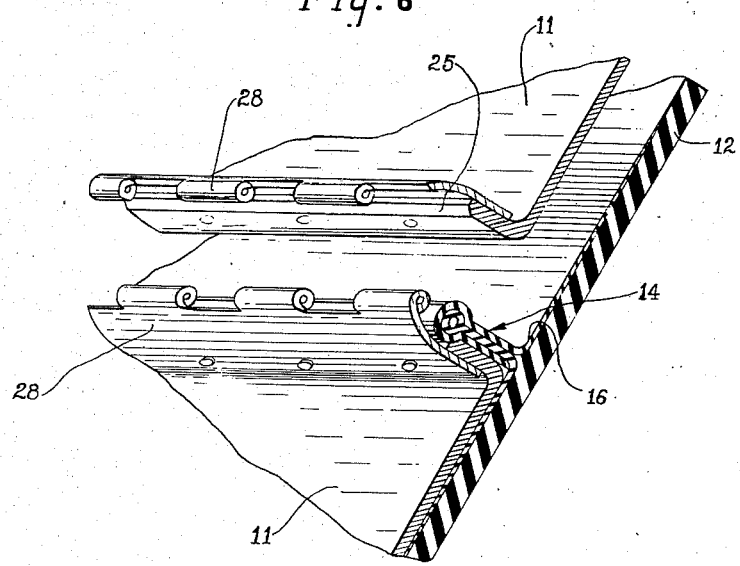
Fig. 6 is an enlarged exploded view illustrating the method of assembling the surrounding sections to the tabs on the collapsible cell.

Referring now more particularly to Figs. 2 and 6, there will be seen more clearly the specific features of the present invention. On the flexible tank 12 and spaced at about the periphery of the same are a plurality of anchoring tabs 14. These tabs are made up of less flexible material than the tank itself and are secured to the same by well known methods, such as in the case of rubber, by cementing or vulcanizing processes.

The tab 14 is formed in two portions 15 and 16, each respectively secured to the tank at opposite sides of their union with each other. The portion 15 is outwardly projected, as indicated at 17, and has thereon an enlarged cylindrical shape head portion 18 with a metal rod 19 extending therethrough, in order that adequate stiffening for the tab is provided.

Made to nest about the projection 17 of the portion 15 is a similar outward projection 20 formed at its outer end to fit about the enlarged head 18, as indicated at 21, and to extend back upon itself along the projection 17 of the portion 15 in the manner as indicated at 22. With the two portions 15 and 16 so assembled together, there is provided the completed anchoring tab 14. It will be apparent that there is provided in the flexible tank a plurality of these anchoring tabs depending in number upon the number of sections and in particular, upon the number of unions of sections about the tank. The formation of the tab itself is such that there is provided an adequate head portion for registering of formations 23 and 24 of the respective adjacent sections 11.

These formations 23 and 24 are outwardly turned and radially extended flanges having seats 25 adapted to register with the enlarged head of the tab. Faces 26 of the flanges 23 and 24 are brought into clamping relation against what may be termed a neck portion 27 of the tab, wherein the same are retained by cooperating gripping elements 28 and 29 fastened to the respective flanges by rivets 30. These cooperating gripping elements are finally secured together by a longitudinally extending pin 31.

In the assembly of the tank in its supporting means, the assembling may start from the bottom wherein the bottom sections are first put in position and the tank seated upon them. The tabs are then registered in their proper locations on the bottom section, and the upper sections are connected to the lower section in a manner so as to secure the tabs in their proper position. Other sections are assembled in like maner. The final assembly may take place in the final union of the sections at the top. While it may be possible upon the assembly of the aircraft to place the completed tank and its supporting means into the aircraft in its entirety, it should be apparent that a removal of the same in its entirety is not always possible, since the aircraft itself could not be readily disassembled. This particular tank bears substantially the shape of a section through a fuselage and rests in a location in the same rearwardly of the pilot's station.

Should it be necessary to remove the flexible tank or to replace one of the supporting sections due to some injury that may be had to either, this may be done without the necessity of access to the outer periphery of the tank. It may be done by simply withdrawing endwise the pins 31, thereby freeing the gripping elements and the respective sections containing the same. The sections are then removable endwise. Once the sections above the bottom section have been removed, the flexible tank can be readily released from its supporting means.

Figure 4:
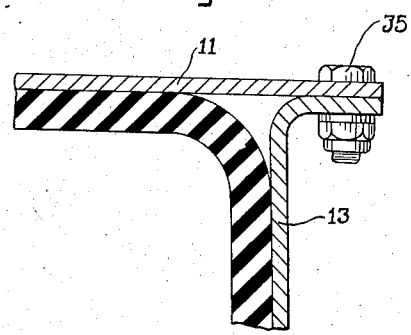
Fig. 4 is a view similar to Fig. 3 of the connection of the end plate and surrounding section at a location where the piano hinge type connecting means could not be used.
Figure 5:
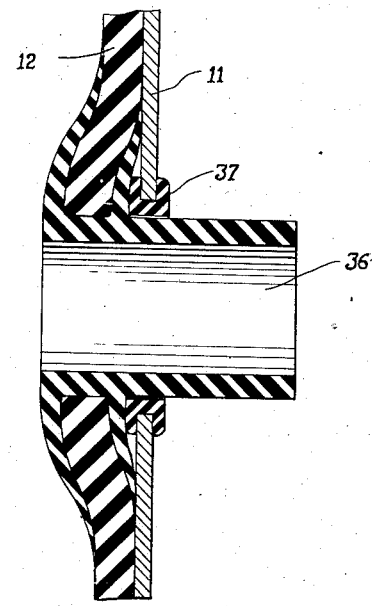
Fig. 5 is an enlarged cross section taken of an outlet of the tank extending through a hole in the supporting means.

To the ends of the surrounding sections 11 there is connected the end plate 13. As illustrated more particularly in Figs. 3 and 4 it will be noted that two forms of fastening means are used. As shown in Fig. 3 the end plate 13 is connected by similar cooperating gripping elements 33 with their pin 34 that were used for the connecting of the surrounding sections together. Such a form of connecting means saves considerable time in assembly and disassembly of the unit sections and plates. Only where it is necessary about the end of the supporting means is there used the ordinary bolt and nut means 35, such as shown in Fig. 4. The only instance for the use of this bolt and nut means is that of the more rounded surfaces of the tank, such as at the rounded top and bottom. The tank has pipe openings 36 adapted to project respectively through openings 37 in a manner shown more particularly in Fig. 5.

It should now be apparent that the supporting means for the tank can be readily disassembled from a location adjacent to the end of the tank. Wires or pins for the surrounding sections are withdrawn in a direction lengthwise of the tank. The pin for the plate and surrounding sections is likewise similarly accessible at the end of the tank and, as well, are the bolt and nut means 35.

It should also be apparent that there is provided a novel form of tab provided with an enlarged head portion which extends throughout the length of the tab and to which registry of the same may be made with seats formed on the surrounding sections. When the sections are finally seated against the enlarged portion, positive securing of the tab to the supporting means is had, so that the possibility of the flexible tank collapsing, due to lack of support, is practically extinct. As a result of this positive connection, the greatest of shocks resulting in the operation of the aircraft, such as upon catapulting, will be withstood.

It should also be apparent that there has been provided a very simple type of construction, one wherein ready assembly of the tank to its supporting structure and the disassembly of the tank within a confined space, may be readily had.

While various changes may be made in the detail construction of the present invention, it shall be understood that such changes will be made within the spirit and scope of the present invention as defined by the appended claims.

We claim as our invention:

1. In a tank assembly, a self-sustaining casing including a plurality of longitudinally extending sections, a joint connecting an adjacent pair of said sections, a flexible container housed within said casing, said joint having longitudinally extending projecting parts which form an outwardly extending hollow rib, longitudinally extending openings in each of said projecting parts, a longitudinally extending anchoring tab on said container and enclosed by said rib, and a longitudinally extending pin extending through said openings of both of said adjacent projecting parts for causing the latter to grip said tab when said adjacent sections occupy their normal positions in said assembly, said pin being removable to permit disconnection of said adjacent sections and at the same time effect the release of said tab.

2. In a tank assembly, a self-sustaining casing including a plurality of longitudinally extending sections, a joint connecting an adjacent pair of said sections, a flexible container housed within said casing, said joint having longitudinally extending projecting parts which form an outwardly extending hollow rib, longitudinally extending openings in each of said projecting parts, a longitudinally extending anchoring tab on said container and enclosed within said rib, the outer end of said tab being beaded, and a longitudinally extending pin extending through said openings of both of said adjacent projecting parts so that they grip said tab behind said beaded end, whereby when said sections occupy their normal positions in said assembly withdrawal of said tab from between said parts is resisted by the engagement of said parts with said beaded end.

3. In a tank assembly, a self-sustaining casing including a plurality of longitudinally extending sections, an adjacent pair of said sections having outwardly directed longitudinally extending flanges, said flanges having outer edges which are adapted to provide seats, a flexible container housed within said casing, an anchoring tab on said container having a beaded outer end, longitudinally extending projecting parts connected to said outwardly directed flanges, longitudinally extending openings in each of said projecting parts, and a longitudinally extending pin extending through said openings of both of said adjacent projecting parts, whereby said parts act upon said outwardly directed flanges to cause the latter to grip said tab behind said beaded outer end so that withdrawal of said tab from between said flanges is resisted by engagement of said beaded end with said seats, said pin being removable to permit disconnection of said adjacent sections and at the same time effect the release of said tab.

4. In a tank assembly, a self-sustaining casing including a plurality of longitudinally extending sections, outwardly directed longitudinally extending flanges on said sections, seats on the outer edges of said flanges, a flexible container housed within said casing, an anchoring tab on said container having a beaded outer end, a reinforcing element enclosed within said beaded outer end, longitudinally extending projecting parts connecting to said outwardly directed flanges, longitudinally extending openings in each of said projecting parts, and a longitudinally extending pin extending through said openings of both of said adjacent projecting parts, whereby said projecting parts act upon said outwardly directed flanges to cause the latter to grip said tab behind said beaded outer end so that withdrawal of said tab from between said flanges is resisted by engagement of said beaded end with said seats, said pin being removable to permit disconnection of said adjacent sections and at the same time effect the release of said tab.

RAYMOND C. BLAYLOCK.
HARRY R. BERRISFORD.